Sept. 5, 1967      M. B. WOOD      3,339,221
INTERMITTENT WINDSHIELD WIPER SYSTEMS
Filed March 11, 1965
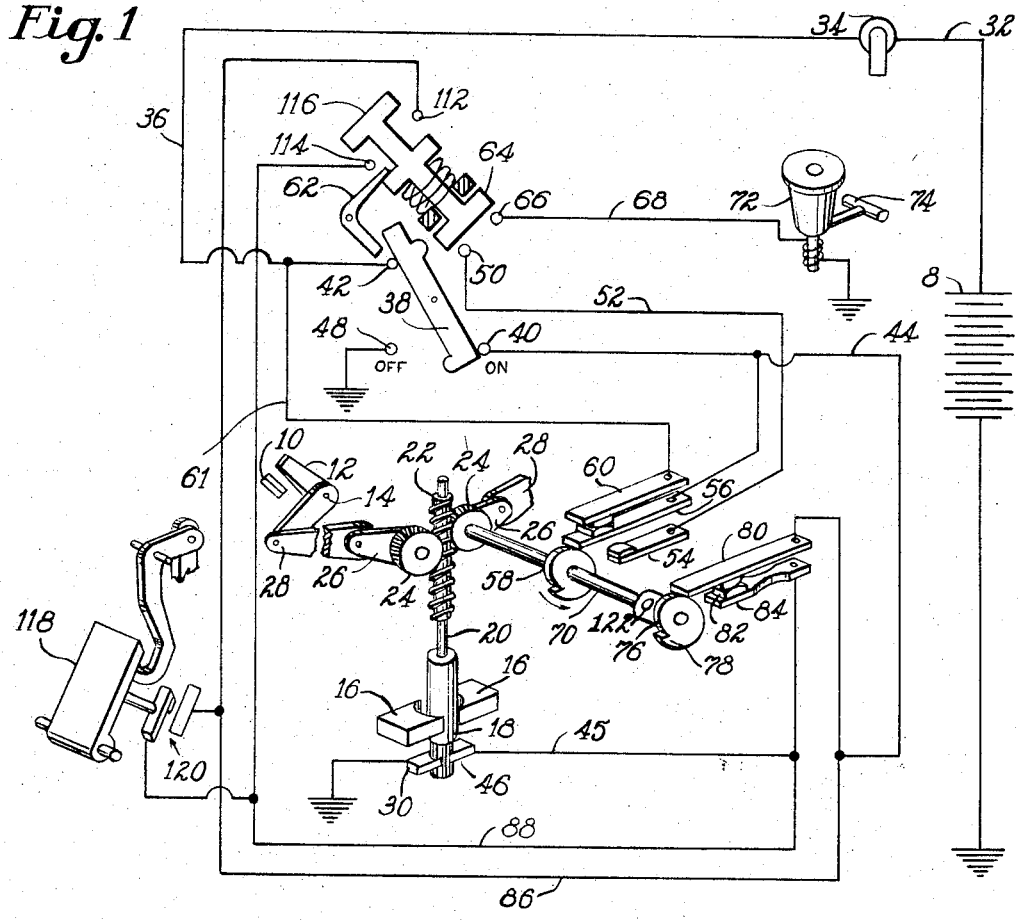
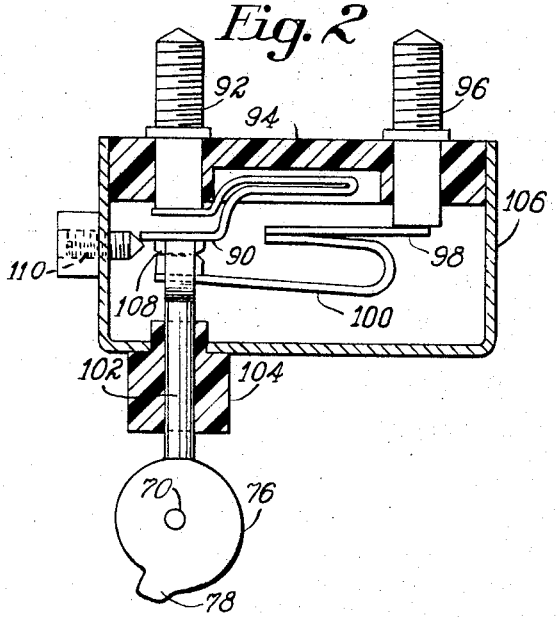
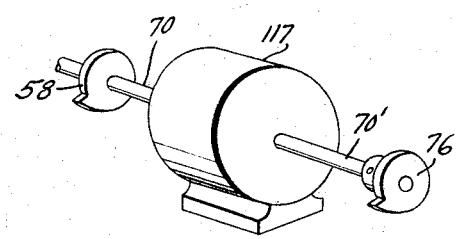
Inventor
Morris B. Wood
By his Attorney
Edward W. Fearing

United States Patent Office 3,339,221
Patented Sept. 5, 1967

3,339,221
INTERMITTENT WINDSHIELD WIPER SYSTEMS
Morris B. Wood, 26 Central St., Ipswich, Mass. 01938
Filed Mar. 11, 1965, Ser. No. 438,904
7 Claims. (Cl. 15—250.12)

ABSTRACT OF THE DISCLOSURE

A variable rate timing device comprising a yielding heat responsive strip actuated mechanically by a motor for also actuating and intermitting operation of a windshield wiper by testing or derating the timing device and eventually discontinuing completely the operation of the wiper in accordance with the resistance met by it in moving over a windshield. A simple manual control is provided for reestablishing a discontinued wiper operation whenever required.

---

The present invention relates to improvements in intermittent windshield wiper systems of the type disclosed in United States Letters Patent No. 3,146,482 granted Sept. 1, 1964, upon application of the present inventor.

The windshield wiper system of the prior patent is arranged for projecting a jet of wash fluid across the windshield of a vehicle whenever the operator of the vehicle feels it desirable to do so. The only prerequisite for such projection is that a wiper blade also acting on the windshield must be in operation in order to spread the fluid as soon as it strikes the windshield, and thereby to effect a reliable cleaning operation for restoring visibility through the windshield.

Windshield wiper systems have been devised wherein a windshield wiper blade is operated intermittently according to the desire of the operator or continuously and, in some instances, it has been found possible to initiate an intermittent operation automatically whenever the windshield is wiped clear of fluid before it reaches a nearly dry condition. Automatic initiation of intermittent wiper operation however, always has been determined by an overall control determined by averaging a plurality of wiping cycles of two strokes so that the need for proper adjustment of each wiper cycle is not effectively met and erratic fluctuation may result without reliable cleaning of the windshield after projecting fluid across it or for other conditions.

The present invention has for one of its objects, therefore, to improve and simplify an intermittent windshield wiper system with a single timer unit having an automatic variable control in such a way that the single unit may serve effectively not only as a more sensitive timing device than heretofore to start and stop the wiper but also to adjust automatically during each cycle of the wiper blades, according to the condition of the windshield, the timing action of the unit as a result of differences in current utilized by an electric motor which operates the windshield wiper when the wiper blades are moving over a wet windshield or a dry one, eventually causing the wiping operation to be discontinued entirely. It is thus possible to utilize the single unit timer automatically in each cycle of wiper operation to impose on the wiper an intermittent variable rating in direct proportion to the dryness of the windshield or to discontinue the wiper operation. Automatic control for each single cycle has, heretofore, been impossible and previous attempts have required a plurality of cycles, especially for intermediately dry conditions of a windshield.

In the accomplishment of the variable rating required of the timing device a lower rating is artificially created during each operation of the wipers by a testing device for derating the timing device near one end (preferably the parking end) of one of the wiper strokes. This derating enables the timing device to open the circuit to the wiper motor under control of the current consumed according to the frictional resistance offered whenever a dry windshield condition exists, and is accomplished by utilizing a double portion bimetallic strip capable of varying its timing action by flexing it both by heat from the motor current and by force derived mechanically from the motor once within each oscillating cycle of the wiper. The timing period of course will be determined by the cooling action of the bimetallic strip and the temperature produced in the strip by current flow and the discontinuance of wiper operation will be determined by the timed relation between the timing device and the remainder of the wiper cycle after the wiper blades stop.

Other objects of the invention are to improve and simplify generally the operation of an intermittent windshield wiper system wherein it is also readily adaptable for simple manual control. As a result intermittent wiper operation may be initiated or the wiper operation may be reestablished automatically and in case it is discontinued by a dry windshield condition it may be reestablished by a simple manual operation, preferably by a manual control for a wash water projecting pump, such as that disclosed in Patent No. 3,146,482.

In that patent a wash water pump is energized whenever a control knob of an off-and-on panel switch arranged to energize the windshield wiper is turned to a momentary wash position, causing streams of wash fluid to be projected across the windshield. Obviously, if the windshield wiper should be thrown into intermittent operation just before the manual control button were operated to actuate the wash fluid pump a stream of unwiped fluid might obscure the vision of the driver with undesirable results. Also, whenever the operator decides to accelerate the vehicle which he is driving a critical condition from lack of visibility may exist if the wiper should intermit its operation. For this reason a second overriding switch may be connected for operation with a vacuum diaphragm sensitive to intake manifold pressure or to the position of an accelerator for controlling the speed of the vehicle. Both the overriding switches will in this embodiment be connected in parallel and are capable of acting to reestablish the operation of the wiper in case it has been discontinued by the timing device.

These and other features of the invention as hereinafter described and claimed will be apparent from the following detailed specification taken in connection with the accompanying drawings, in which;

FIG. 1 is a detailed, partly schematic wiring diagram of an automatically controlled windshield wiper system embodying the features of the present invention;

FIG. 2 is a view in partial section and side elevation of an alternative form of double rate timing and protector device capable of being substituted for a similar one shown in FIG. 1; and FIG. 3 is a perspective view of a reduction gear employed in one embodiment of the invention.

The system, except as hereinafter described, is substantially the same as that disclosed in Patent No. 3,146,482. As shown in this patent the present system includes a source of power comprising a storage battery 8 for operating a pair of windshield cleaning wiper blades, a lower portion of one of which is shown at 10 connected to an oscillating arm of a lever 12 fulcrumed on a pivot 14 at the lower margin of a windshield (not shown). For operating the wiper blades the lever 12 is driven by a motor having permanent Alnico field magnets 16 within the field of which a rotor 18 for the motor is mounted. The rotor is supported on a shaft 20 having fixed to its upper end a worm 22 engaging at opposite sides a pair of worm wheels 24 for driving the wheels in opposite directions. Connected to each wheel is an arm 26 pivotally connected to the levers 12 through links 28, the arrangement being such that continued rotation of the rotor 18 oscillates the wiper blades 10 to clean the windshield. When the operation of the windshield cleaning wiper is to be discontinued the wiper blades are brought to inoperative park positions near the lower margin of the windshield.

To control the operation of wiper blade actuating motor one brush 30 of the motor is grounded with one pole of the battery 8. The other pole of the battery is connected to a live wire 32 to an ignition switch 34 and thence by a service wire 36 to a double throw panel switch 38 having a movable conducting lever operable manually and engageable with control contacts. The panel switch when in an "ON" position connects a running contact 40 through a live contact 42 to the service wire 36. The running contact 40 carries current from the switch 38 through a wire 44 from which it passes to a wire 45 connected by a variable rate timing device to a brush 46 of the motor, providing a running circuit for the motor, in a manner to be described through the grounded contact 30.

To stop the operation of the motor and to bring the wiper blades to rest automatically in park positions the panel switch 38 is shifted from the "ON" to the "OFF" position. In its "OFF" position the movable lever of the switch is engaged with a grounded contact 48, current from which flows through the movable switch lever to a braking contact 50 connected through a wire 52 to an impulse contact 54 comprising a flexible strip secured at one end in fixed position and having a contact button at the other end arranged to be engaged with a simliar button on a synchronizing contact 56 carried by a flexible strip fixed in parallel relation to the impulse contact 54 and arranged with its other end to engage and be moved by a cam 58 made fast to a shaft 70 forming a mounting for one of the worm wheels 24, so that the shaft 70 makes one rotation for each cycle comprising two oscillating strokes of the windshield wiper blade. The cam 58 has a notch into which the end of the strip carrying the contact 56 fits whenever the wiper blades reach park position at one end of one stroke in the wiper cycle. When the strip carrying the contact 56 fits within the notch of the cam 58 circuit connections between the contacts 56 and 54 are completed, causing an impulse to be transmitted to the contact 50.

When the switch 38 is moved to "OFF" position the motor is deenergized and this impulse is grounded through contact 48 producing a dynamic braking action in the motor so that the wiper blades immediately are brought to rest in park positions. To insure that the motor will run positively until the park position is reached the synchronizing contact 56 is engaged in its raised position by a blade return contact 60, which in turn is connected through a wire 61 to the service wire 36.

While the wiper blades are being oscillated and the switch 38 is moved to a position somewhat beyond the "ON" position, the upper end of its movable lever engages an insulating lever 62 fulcrumed on the switch frame and arranged to press a spring actuated bridging contact 64 of an auxiliary switch into engagement with the braking contact 50 and a pump contact 66 connected by a wire 68 to an electrically operated cleaner fluid pump 72. The actuating coil for the pump is grounded and the outlet for the pump runs into a pipe 74 extending to each area of the windshield covered by the blades 10. Since an electrical impulse is transmitted to contact 50 each time the wiper blades arrive at their park positions, regardless of whether the windshield wiper is continuing to be operated or whether it is disconnected from its source of current supply an impulse will be transmitted to the pump 72. As thus far described the wiper actuating system is similar to that disclosed in Patent No. 3,146,482.

According to a feature of the present invention a variable rate timing means is driven by the rotor of the motor and is also arranged automatically to be controlled by the current consumed by the motor to open the circuit to the motor momentarily by means of contacts connecting wires 44 and 45, previously referred to, for longer periods of time as the wiper blades meet increased resistance from a dried windshield surface, the windshield eventually becoming completely dried, so that the intermittent open contact periods are increased to a maximum, the wiper operation eventually being discontinued entirely. When the amount of fluid is greatest on the windshield the greatest possible lubricating effect will be produced and the smaller the current consumed by the motor. Much shorter periods of interruption will then occur, if any.

For effecting automatic variable timing control the shaft 70 has secured to it a derating cam 76 provided with a single enlargement 78 arranged to flex the free end of a heat responsive yielding bimetallic strip 80, the opposite end of which is rigidly fixed to the frame of the motor. The bimetallic strip 80 carries a button engaging a contact plate 82 on the free end of a second yielding bimetallic strip 84 secured in fixed position at its other end on the frame of the motor.

The bimetallic strip 80 also is flexed to reduce the pressure at its free end on the cam 76 under the heating influence of the current passing through the rotor 18 of the motor, the pressure decreasing sufficiently after unusual heating to move the strip 80 entirely away from the cam, if necessary and also away from the contact plate on the bimetallic strip 84. In this way the two strips act to derate the timing device and to interrupt temporarily the current flowing through them whenever the current increases to a predetermined maximum. Below the predetermined maximum value of the strip 80 is merely flexed without interrupting the flow of current. To render the current interrupting action of the strips sensitive to the flow of current through the motor the fixed ends of the strips are connected to wires 86 and 88 interposed between the ends of the wires 44 and 45. Thus, all of the motor current is required to pass through the bimetallic strips 80 and 84.

By this circuit arrangement an excessive current flow causes the motor circuit to be interrupted for a period of time determined by the temperature and cooling of the strips and the relative positions of the cam 76 and the strip 80. The positions at which the strips are fixed to the motor frame are adjusted to cause interruption of the motor circuit whenever the current flow exceeds by an approximately 10% that amount required to drive the motor while the blades 10 are moving over a completely dried surface of a windshield and before the enlargement 78 on the cam 76 raises the end of the strip 80.

To afford a quick circuit opening action of the contacts on the strips 80 and 84 the strips are arranged to act oppositely from each other, that is when strip 80 tends to open the circuit the strip 84 tends to close it, except that the strip 84 is shorter than the strip 80 and strip 80 eventually predominates. The strip 84 which tends to close the circuit is shorter than the strip 80 and has its central area cut away to produce a greater resistance than is found in the strip 80 and therefore the strip 84 has a greater heating effect per inch. As soon as there is any slight circuit opening motion between the contacts on the strips the shorter, higher resistance strip 84 immediately begins to cool and opens up the gap between the contacts wider. Thus, the enlargement 78 offsets the 10% excess rating and a quick opening action is produced. In this respect the arrangement of the strips 80 and 84 similar to the two portion strip of United States Letters Patent No. 2,585,068, granted Feb. 12, 1952 upon application of the present inventor and the bimetallic strip of the present system is composed of two portions which although separately constructed act together to produce the desired results. The shorter strip 84, being reduced in cross sectional area offers a greater resistance per unit of length also to the flow of current, although this is not essential for the effective operation of the compound circuit opening effect. Preferably, the two portions of bimetallic material are of identical overall resistance although the circuit closing strip 84 is substantially shorter than the circuit opening strip 80.

It is within the scope of the invention also to utilize in an overload circuit breaker similar to that of the prior Patent No. 2,585,068 modified to the extent illustrated in FIG. 2. When this is done the circuit breaker illustrated in the patent just referred to is reversed in its position and instead of mounting the fixed contact shown at 18 in the patent on a terminal post it is secured to one end of a hairpin spring 90, the other end of which is secured to a terminal post 92. The terminal post 92 is mounted in an insulating base 94 carrying also a second terminal post 96 to which the two portion bimetallic strip 98, 100 is made fast. The shorter higher resistance portion 98 is secured to the terminal post 96.

For testing the heated condition of the circuit breaker, so that it may be utilized also for a timing device the hairpin spring 90 is made wider than the bimetallic strip portion 100, the portion 100 being straddled by a forked upper end of a pin 102 slidingly mounted in a block 104. The block 104 is secured in a housing 106 surrounding the bimetallic strip and the hairpin spring 90 has one contact 108 fixed to it. The other contact is secured to the bimetallic strip portion 100, as in Patent No. 2,585,068 just referred to. When the pin 102 is raised it moves the contact 108 a short distance to relieve the tension in the bimetallic strip portion 100. The contacts are thus enabled to open when a smaller current than ordinary flows between them, thus derating the protector.

For the purpose of reciprocating the pin 102 its lower end engages the cam 76 and is reciprocated each time that the projection 78 raises it. To assist in obtaining the correct initial adjustment of the two bimetallic portions 98, 100 the contact carrying end of the hairpin spring 90 is engaged by a conical end of a pointed screw 110 threaded into an enlargement on the casing 106.

To reestablish the wiper operation after being entirely discontinued or to override the circuit opening action of the two portion circuit breaker and timer 80, 84 or 98, 100 the wires 86 and 88 comprise an overriding circuit which extends to a pair of contacts 112 and 114 arranged to be bridged by a cross bar 116 at the upper end of a spring pressed rod connecting it with the bridging contact 64. When the washer fluid pump 72 is actuated by imparting an extra movement of the switch blade 38, such movement also causes bridging contact 116 to connect the contacts 112 and 114, so that it is not possible for the wiper blade actuating motor to be brought to rest until the wash fluid has been distributed by several strokes of the wiper blades.

To enable the wiper blades to distribute the wash fluid still more thoroughly than would otherwise be possible it may be desirable to divide the shaft 70 into two parts including a part 70' (FIG. 3) between the cams 58 and 76 and to insert between the parts a reduction gear train 117 having a ratio of about 10 to one. In this way a greater interval of time will occur between periods of intermittent operation of the wiper blades than when the cam 76 turns at the same speed as the cam 58.

A similar overriding action takes place when the vehicle is accelerated by depressing an accelerator treadle 118. For this purpose a treadle actuated switch 120 is connected to close the overriding circuit 86, 88 in a manner similar to that occurring when wash fluid is applied to the windshield. Thus, under mild weather conditions there is no possibility for causing intermittent operation of the windshield wiper during accelerating periods of the vehicle.

In more complete description of the operation of the variable rating device it is readily apparent that, depending upon the heat produced by the motor current required to overcome the mechanical resistance offered in moving the wiper blades the cam 76 may stop in either of two positions after circuit interruption. In one position the cam may stop with its enlargement beyond the end of the strip and in another position the cam may stop where the enlargement 78 is directly beneath the strip 80. If the cam stops with the enlargement beyond the contact strip 80 the wiper circuit will be reestablished in the usual way after the period of time required to cool the strips 80 and 84.

At the time the enlargement 78 engages the strip 80 the motor ordinarily is under maximum load, so that if the circuit is opened the wiper blades and the motor come to rest while the blades are in park positions without excessive overthrow or necessity for dynamic braking. After the motor circuit is opened it is not reestablished until both the shorter and longer strips 80 and 84 cool, the shorter strip cooling most rapidly from a higher temperature. Starting and stopping continue alternately so long as the cam stops with its enlargement 78 beyond the end of the strip 80.

If the cam 76 stops with its enlargement 78 directly beneath the end of the strip 80 the enlargement prevents reengagement of the contact button on it with the contact plate 82, so that the motor circuit is not reestablished. This occurs when the mechanical resistance offered by a completely dry windshield to movement of the wiper blades or by any other cause increases the motor current to an unusually high value, so that the circuit is opened too early to permit the enlargement to clear the strip 80. In this case the strip 80 is not able to bring its button against the contact plate 82 because the enlargement 78 holds the strip 80 raised. In this case the wiper blades will not have been moved to park positions and the operator of the car will know that the operation of the windshield needs to be reestablished manually.

To reestablish manually the automatic intermittent operation of the windshield wipers and to bring the enlargement 78 of the cam 76 beyond the end of the strip 80 the operator shifts the control switch 38 in a counterclockwise direction beyond the "ON" position. Shifting the control switch 38 beyond the "ON" position completes the circuit from the parking contact 60, synchronizing contact 56, wires 44, 86 and 88, contacts 114, 116 and 112, and wire 45 to the motor and ground, causing the enlargement 78 to be moved out from beneath the strip 80. The strip 80 immediately brings its button against the contact plate 82 and reestablishes the wiper motor circuit for continued or intermittent operation, as required.

The wiper fluid pump will not be energized when the control switch is actuated at this time, unless it is held beyond the "ON" position for an appreciable time, the synchronizing contact 56 not being engaged with the impulse contact 54. As an alternative the car operator may depress the accelerator treadle 18 momentarily for the same purpose if he so desires.

The fundamental effect of the variable rating control of the present invention is to change the overall motor output in accordance with the resistance met by the wipers moving over the windshield. For regular operation on a wet windshield the level of motor output is somewhat less than 100%. For unusual conditions, such as snow or the necessity of accelerating a vehicle while passing another or while applying washing fluid to the windshield the maximum level of motor output is increased automatically to 100% rendering the derating device inoperative. The device which serves to set up the derating level of motor output tests the heated condition of the controller once for each cycle of wiper operation to determine the extent by which the controller needs to derate the motor output. The controller thus during each cycle of the wiper causes the motor circuit to be opened for a period of time bearing a corresponding relationship to the period of time in which the motor is operated. This is done by opening the circuit to allow the strip 84 to cool and move away from the strip 80.

In a further feature of the invention utilizing the derating cam 76 it is possible to bring the wiper blades to rest in "park" position in the usual way when the switch 38 is moved to "OFF" position. If the derating cam 76 is adjusted on the shaft 70, however at a position which will not bring the wiper blades to rest in a "park" position but in a markedly different position during intermittent stopping periods then the operator of the vehicle will realize from the positions of the blades that they will be restarted when he moves the control switch 38 to "OFF" position. Change in position of the cam 76 on the shaft 70 is accomplished by loosening a set screw 122 in the cam and after changing the position of the cam the screw 122 is retightened against the shaft to secure the cam in place.

The nature and scope of the invention having been indicated and a particular embodiment having been described, what is claimed is:

1. A windshield cleaner having a wiper, a motor for operating the wiper in successive cycles, and an electrical circuit for the motor, in combination with variable rate timing means including a bimetallic strip flexed both by heat from the current consumed by the motor and by mechanical force derived from the motor during each cycle of wiper operation to open the circuit to the motor for a longer period of time when the motor current is higher and for a shorter period of time when the current is lower.

2. A windshield cleaner, as in claim 1, in which the variable rate timing means includes a cam having an enlargement arranged to engage the bimetallic strip and to move beyond the strip for reestablishment of the motor circuit when the bimetallic strip is cooled.

3. A windshield cleaner, as in claim 2, in which there is provided a second bimetallic strip cooperating with said first mentioned strip and tending to close the motor circuit when said first strip is flexed to open it, said first strip eventually predominating to afford a quick circuit opening action as the second strip is cooled.

4. A windshield cleaner, as in claim 3, in which the cooperative action of the two strips may, upon unusual heating, cause the cam to be stopped with its enlargement directly beneath said first strip, thereby preventing reclosure of the motor circuit and there is provided an auxiliary manual switch to enable the motor circuit to be reestablished after the cam has been stopped with its enlargement beneath said first strip.

5. A windshield cleaner, as in claim 4, in which the timing means acts in any position other than that with the enlargement of the cam beneath the said first strip, as an automatic reclosing overload circuit breaker to open the circuit for the motor when the motor is stalled.

6. A windshield cleaner, as in claim 3, in which each bimetallic strip carries a contact connected in the motor circuit and is heated from all of the motor current to cause interruption of the motor circuit whenever the current flow exceeds by approximately 10% that amount required to drive the motor while the wiper moves over a completely dried windshield.

7. A windshield cleaner, as in claim 2, in which there are provided parking means also including a cam driven by the motor and a reduction gear train between the variable rate timing cam and the parking cam to produce a greater interval of time between periods of open circuit than otherwise.

References Cited

UNITED STATES PATENTS

| 2,987,747 | 6/1961 | Oishei et al. | 15—250.16 |
| 3,110,056 | 11/1963 | Oishei et al. | 15—250.12 |
| 3,148,399 | 9/1964 | Ziegler | 15—250.02 |

CHARLES A. WILLMUTH, *Primary Examiner.*